United States Patent [19]

Haslett et al.

[11] 4,121,455

[45] Oct. 24, 1978

[54] MEASURING A FLOW OF GAS THROUGH A COMBUSTION ENGINE

[75] Inventors: Robert Alan Haslett, Shoreham by Sea; Charles Peter Howard, Pulborough; Richard Winston Wheeler, Brighton, all of England

[73] Assignee: Ricardo & Co., Engineers (1927) Limited, England

[21] Appl. No.: 821,196

[22] Filed: Aug. 2, 1977

[30] Foreign Application Priority Data

Aug. 6, 1976 [GB] United Kingdom ............... 32909/76
Aug. 17, 1976 [GB] United Kingdom ............... 34272/76

[51] Int. Cl.$^2$ ............................................... G01F 1/70
[52] U.S. Cl. ............................................... 73/194 M
[58] Field of Search ................... 73/23, 194 R, 194 E, 73/194 M; 23/232 R, 232 E, 254 E, 255 E

[56] References Cited

U.S. PATENT DOCUMENTS

| | | | |
|---|---|---|---|
| 2,921,841 | 1/1960 | Gerrish | 23/232 |
| 3,435,659 | 4/1969 | Sternberg | 73/194 X |
| 3,520,657 | 7/1970 | Frumerman | 73/23 |
| 3,545,270 | 12/1970 | Chang | 73/194 |
| 3,759,259 | 9/1973 | Fletcher | 73/194 |
| 3,881,351 | 5/1975 | Prachar | 73/194 |
| 4,055,083 | 8/1977 | Haas | 73/194 |

*Primary Examiner*—Herbert Goldstein
*Attorney, Agent, or Firm*—Cushman, Darby & Cushman

[57] ABSTRACT

In measuring the mass flow rate of the inlet air entering an internal combustion engine or other combustion device, or of the exhaust gas discharged therefrom, a constant metered flow of helium or other inert tracer gas is introduced through a temperature-controlled critical flow orifice into the air intake of the engine or device, and the exhaust gas is continuously sampled and the sample analyzed by means of a mass spectrometer. From the measurement of the concentration of the tracer gas in the exhaust gas sample provided by the mass spectrometer, the required mass flow rate is derived and displayed. The mass spectrometer may be employed to measure in sequence the concentrations of other constituents of the exhaust gas sample as well as that of the tracer gas, and from these measurements other parameters related to the mass flow rate of intake air may be derived by means of a microprocessor, and displayed.

16 Claims, 3 Drawing Figures

MEASURING A FLOW OF GAS THROUGH A COMBUSTION ENGINE

This invention relates to methods and apparatus for measuring a flow of gas at a given point in a combustion engine.

Traditionally measurements of gas flow quantities for internal combustion engines and other similar devices have been made by operating at a given steady state and using instruments requiring a definite time to register the flow quantity or quantities under investigation. Some of the flow are also pulsating ones which demand the use of special instruments or the provision of a smoothing capacity between the engine and the flow measuring device. By way of examples: (a) fuel consumptions are determined by measuring the time the engine takes to consume a known volume (or weight) of fuel whilst the engine is operated at the fixed test speed and load, and (b) air flow is measured by using an orifice plate after providing adequate smoothing capacity to reduce pulsation amplitudes or, better, using a viscous flow air (or gas) meter (British Pat. No. 473139). These devices require a finite time to obtain a steady pressure drop reading across the measurement element, also for a determination of the downstream pressure and temperature required for the calculation of the flow quantity referred to a standard temperature and pressure.

Whilst such methods are satisfactory for steady state measurements, there is now a need for flow measuring devices having very fast response times to allow the virtually instantaneous variations of flow which occur when an automotive engine is driven on the road or on a roller dynamometer following one of the legally set driving cycles for the measurement of exhaust gas emissions. Such fast reading instruments are particularly required for experimental development in relation to the reduction of exhaust emission levels.

In a typical spark-ignited, throttle-controlled, gasoline engine the full-speed full-power air consumption will be some 30 times the low-speed engine idling value. This raises problems with accuracy of measurement over the whole flow range quite apart from any question of instrument response times.

The present invention is intended to meet these requirements.

According to the present invention, a method of measuring the flow rate of gas at a given point in a combustion engine comprises introducing a constant metered flow of an inert gas, referred to as tracer gas, into the inlet gas entering the intake of the combustion engine during the operation of the engine, simultaneously withdrawing a continuous sample flow of the exhaust gas from the engine exhaust system and supplying a constant-rate flow of the sample gas to a mass spectrometer for analysis, and operating the mass spectrometer to provide a continuous or sequential measurement of the volumetric proportion of the tracer gas in the exhaust gas sample, and utilizing the said measurement to derive an indication of the transient value of the said flow rate of gas in the engine.

The invention is applicable not only to I.C. engines of the reciprocating-piston type but also to I.C. engines of the rotary piston type and to gas turbines. It may also be applied to the external combustion chambers of engines operating on the Stirling cycle and to other combustion devices for use with automotive machines, and the term "combustion engine" is used herein to include all such devices as well as I.C. engines of all kinds.

Conveniently the inert tracer gas comprises helium. Argon may also be used, but helium is preferred because its atomic weight is further apart from those of other possible substances present in the exhaust gas sample.

Calibration may be effected by comparing the reading with one taken when supplying calibration gas flow containing a known proportion of helium to the spectrometer, for example a mixture of gases, such as carbon dioxide, nitrogen and oxygen, with helium in known proportions.

The invention from another aspect comprises apparatus for measuring the flow rate of gas at a given point in a combustion engine, which apparatus includes means for introducing a metered flow of inert tracer gas into the flow of inlet gas entering the intake during the running of the engine, means for simultaneously and continuously withdrawing a sample flow of the exhaust gas from the engine exhaust system, a mass spectrometer and means for supplying a constant rate flow of the exhaust gas sample for analysis to determine the volumetric proportion of the tracer gas in the sample.

In one form of the invention the metered flow of tracer gas is provided by a temperature-controlled critical orifice connected to a supply of inert tracer gas under pressure.

In one simple form the invention is employed for determining the exhaust or inlet gas mass flow rate. In this case the mass spectrometer is tuned to the single mass number of the tracer gas e.g. 4 for helium.

The invention may also be employed for measuring other parameters related to the engine inlet gas charge flow. Thus in another form of the invention the method also includes catalytically reacting the sample of exhaust gas with oxygen, to oxidize any carbon monoxide or unburnt hydrocarbons present, and comparing the concentration of the tracer gas with that of one or more other components of the oxidized sample. For this purpose a mass spectrometer of Quadrupole type is preferably employed and may be arranged to measure the concentrations of $CO_2$, $N_2$ and $O_2$ as well as that of the tracer gas. The output from the mass spectrometer may be fed to a microprocessor to derive measurements of one or more of inlet gas mass flow, fuel flow, inlet gas mass flow plus fuel flow, and inlet gas mass flow divided by fuel flow.

The invention may be carried into practice in various ways, but two specific embodiments thereof will now be described by way of example only and with reference to the accompanying drawings, in which.

Figure 1:
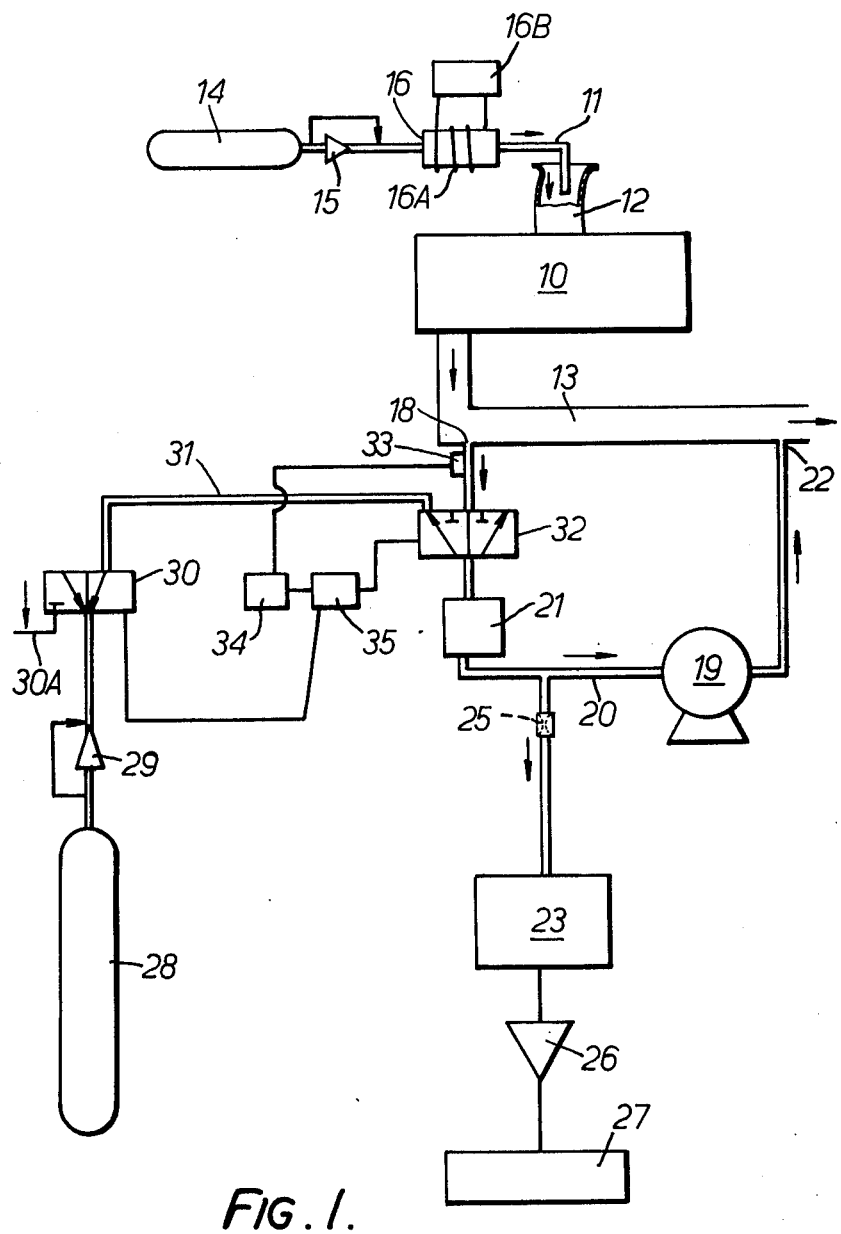
FIG. 1 is a schematic diagram of an arrangement for measuring the exhaust or inlet gas mass flow rate of an i.c. engine.

A simple embodiment of the invention set up to measure the exhaust or inlet gas mass flow rate of an i.c. engine 10 is shown in FIG. 1.

The general principle is to inject a small accurately-measured flow of inert tracer gas into the engine air intake system by a small pipe 11 which is readily clipped into the intake pipe 12, and then determine the proportion of the tracer gas present in the engine exhaust gases discharged through the exhaust system 13. Helium is suggested as the tracer gas since it will not interfere with signals due to other gases involved at the subsequent measuring stage.

Thus, helium gas is injected at a fixed rate into the engine air intake pipe 12 to have a concentration of around 30 parts per million (p.p.m.) in the resultant air-helium mixture when the engine 10 is operating at full speed and wide open throttle. With a constant quantity of helium per unit time continuously injected, and if the idling air flow is one-thirtieth (1/30) that at full power conditions, the helium concentration under idling conditions in the intake mixture will be 900 p.p.m. or 0.09%. Pure helium is supplied from a compressed gas cylinder 14 via a reducing valve 15 and to a temperature controlled "critical flow" orifice 16 to the injection pipe 11. The orifice 16 is surrounded by a temperature-control coil 16A connected to a control unit 16B.

A "critical flow" orifice is one through which the gas flows at the speed of sound, so that the downstream pressure has no influence on the flow rate. To achieve this condition a certain ratio of upstream to downstream gas pressures must be imposed. However when the critical flow condition is satisfied, the flow rate varies directly as the absolute upstream pressure and inversely as the square root of the upstream absolute temperature. Thus, if the upstream pressure and temperature are both accurately maintained, as is proposed, the helium flow rate will remain constant regardless of the discharge conditions in injection pipe 11 and engine intake pipe 12.

It is, of course, possible to use other means for ensuring a constant-rate mass flow of injected helium. These can be based on a number of principles but require the taking of further measurements and their utilisation through a servo feedback circuit to control the flow of helium.

The engine intake air plus its small helium addition now passes into the engine 10, combustion occurs, and the combustion products discharge into the tail pipe 13 of the exhaust system as usual. At any convenient point 18 a sample of the exhaust gases is continuously taken by a pump 19 through a line 20, filtered to remove particles larger than 1 micron by a filter 21, and then returned at 22 to the exhaust discharge pipe 13. Downstream of the filter 21 a mass spectrometer 23 is attached to the line 20 via a small pipe 24 containing a restriction in the form of a tiny 'leak' orifice 25. To avoid condensation of the water vapour contained in the engine exhaust gases the sampling line 20 and pipe 24 must be kept at a minimum temperature of 80° C.

The mass spectrometer 23 can conveniently be of the Quadrupole type which is a known commercial type of instrument. Suppliers include Edwards High Vacuum International Ltd., Manor Royal, Crawley, Sussex, England.

Since such an instrument is continuously pumped with its self-contained vacuum pump down to a pressure of less than $10^{-5}$ Torr (1 Torr = 1 mm Hg = 1.33 millibar), a continuous small leakage (approximately 1 cm$^3$/minute) of exhaust gas products will flow at a constant rate through the restriction 25 into the mass spectrometer 23.

Figure 1A:
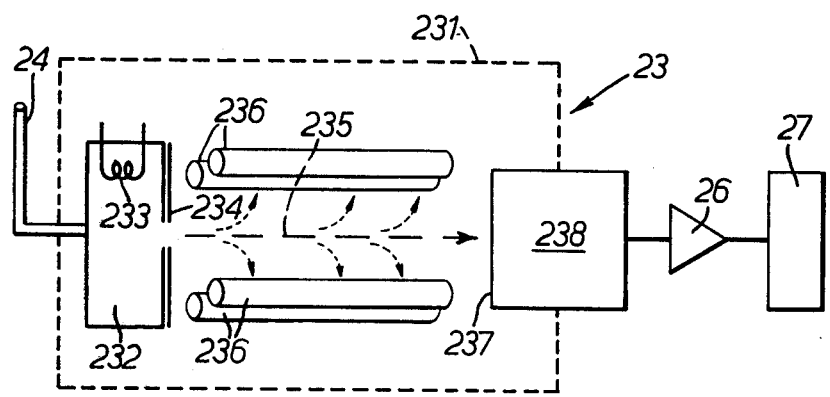
FIG. 1A is a diagram of the mass spectrometer of the arrangement of FIG. 1.

FIG. 1A shows diagrammatically the general arrangement of a Quadrupole mass spectrometer, which operates by ionizing the gas sample and separating the ionized gas particles in accordance with their mass-to-charge ratios. The instrument is housed in a high vacuum enclosure 231 provided with a vacuum pump (not shown), and comprises an ionisation chamber 232 provided with a heated filament ioniser 233 in the enclosure. The ionisation chamber 237 is connected to the sampling pipe 24 so that a flow of gas to be analysed is drawn through the leakage restrictor 25 into the ionisation chamber where it becomes ionised. Some of the ions are electrically extracted, indiscriminately, from the chamber and are focussed by means of electrostatic lenses indicated diagrammatically at 234 into a narrow beam 235 which is directed into a corridor extending between four precisely-positioned elongate parallel cylindrical electrodes 236 in the form of metal rods, constituting the so-called Quadrupole mass filter or ion separator. The rods 236 are electrically connected individually to an r.f. potential and in addition opposite pairs of rods have respective positive and negative d.c. potentials applied to them. The r.f. and d.c. potentials can be adjusted, and can be programmed in any required manner. Depending upon the electrostatic fields thus created at any given time, ions of a certain ratio of mass to charge will be subject to balanced attractions to oppositely-situated electrodes 236, and will continue substantially undeflected along the path of the beam 235, whilst the ions of all the other mass-to-charge ratios will be excessively attracted towards electrodes on one side or the other and will be deflected towards and collected on those electrodes, where they are neutralised, in effect being filtered out. The ions of the particular mass-to-charge ratio which pass through the ion separator 236 impinge on the collector plate 237 of a digital electrometer 238 whose output signal, representing the ion current to which the filter is "tuned," is amplified and digitalised in amplifier 26 and supplied to a numerical read-out device 27. The instrument is tuned by adjusting the r.f. and d.c. potentials to select the particular ion mass-to-charge ratio which is to be passed through the ion separator 236, and hence the particular gaseous constituent of the gas sample whose composition is to be measured. In this way a direct, virtually continuous reading of the transient value of the volumetric proportion of the selected constituent of the gas sample to which the instrument is tuned can be read off on the read-out device 27.

In the arrangement of FIG. 1, the mass spectrometer 23 is set up and tuned to the single mass-to-charge ratio of 4 (helium). Calibration is obtained from the observation of the mass spectrometer reading when supplied from a gas bottle 28 having a known concentration of helium in a mixture of carbon dioxide, nitrogen and oxygen. This calibration gas mixture is supplied through a reduction valve 29, a zeroing change-over valve 30 and a pipe 31 to a two-position calibration change-over valve 32 by means of which either the exhaust gas sample flow from the exhaust system or the calibration gas flow from the cylinder 28 can be switched into the pump circuit and hence to the mass spectrometer for analysis. The zeroing valve 30 has an air inlet 30A which enables atmospheric air to be switched into the pipe 31 for zeroing purposes. The change-over valves 30 and 32 may be operated electromagnetically or otherwise.

Since the atmosphere contains about 4 p.p.m. of helium a periodic calibration check should be made since this value of helium content requires to be subtracted from the values measured as a result of the helium injection process.

If the mass flow rate of injected helium is $M_{He}$, that for the exhaust gases is $M_{EX}$, and the molecular weight of the exhaust gases is $N_{EX}$, then following Dalton's and Avrogadro's Laws the helium concentration in the exhaust gas sample is given by:

$$\text{Conc He} = \frac{M_{He}}{4} \cdot \frac{N_{EX}}{M_{EX}} \quad (1)$$

or $$M_{EX} = \frac{N_{EX}}{4} \cdot \frac{M_{He}}{\text{Conc He}} \quad (2)$$

$M_{He}$ is known from the flow setting of the critical orifice controlling the injection of helium into the engine's intake system, and ConcHe is read off from the mass spectrometer read-out device 27.

So the exhaust mass flow rate can be determined if its average molecular weight is known. The average molecular weight of the exhaust gases is dependent on the air/fuel ratio. Assuming water vapour is not removed from the sample gas, it can be shown that the average molecular weight for the exhaust gases is constant for mixtures leaner than 15.5 but varies for mixtures richer than this.

Provided the air/fuel ratio is greater than 15.5 the above expression (2) permits the exhaust gas mass flow rate $M_{EX}$ to be determined. The read-out device 27 of the spectrometer may be provided with a microprocessor operating a display calibrated directly in terms of $M_{EX}$.

If it is desired to determine the mass flow rate of inlet air into the engine intake this can be found from the value of the exhaust gas molecular weight by use of the expression $$M_a = \frac{V_H}{C} \cdot K$$
where
$$K = \frac{N_{EX}}{1 + 1/14.7 \lambda}$$

and $M_a$ = mass flow rate of inlet air
$V_H$ = volumetric injection rate of helium
$C$ = concHe
$\lambda$ = the equivalence ratio defined as the ratio of the operational air/fuel ratio to that for stoichiometric mixture.

The quantity K in practice has substantially constant values for either dry or wet mixture measurements for equivalence ratios greater than about 1.05. At smaller values of equivalence ratio K falls significantly in value with $\lambda$. Subject to the limitations mentioned, K may be taken as 28.6 for dry gaseous mixture measurements and 27.5 for wet mixture measurements.

The read-out device 27 will include a microprocessor with a display calibrated directly in terms of Ma.

If the mass spectrometer 23 is switched on when the engine is not operating, it will not detect any helium and the read-out instrument 27 will indicate an infinite flow rate. Similarly, after the engine stops the flow measurement system will continue to sample the remaining gas in the exhaust system. This can be avoided by interconnecting an engine oil pressure sensing switch or, in the case of a spark ignition engine, the ignition switch, to control the mass spectrometer. Alternatively, as indicated a vibration sensor switch 33, which is a simple inertia switch fitted to the engine or its exhaust system, can be used. Whichever switching device is employed it can be used to switch the valves 30 and 32 into their positions for measuring exhaust samples when the engine is operational and to connect the mass spectrometer to the standard calibration gas bottle 28 when the engine is switched off. Thus in FIG. 1, the repeated on/off signal from the vibration sensor switch 33 is amplified at 34 and is used to operate a control unit 35 for the valves 30 and 32. The same sensing switch can also be used to turn on and off the supply of helium to the critical orifice.

The basic idea system described with reference to FIG. 1 can be expanded to permit the rapid determination of the following related parameters provided that the carbon/hydrogen ratio of the fuel is known:

(i) Instantaneous total mass flow of exhaust products, $M_{EX}$.
(ii) Instantaneous inlet air mass flow rate into engine intake $M_a$.
(iii) Instantaneous fuel mass flow rate into engine $M_f$.
(iv) Air/fuel ratio.
(v) The sum of the air and fuel flow rates.

Figure 2:
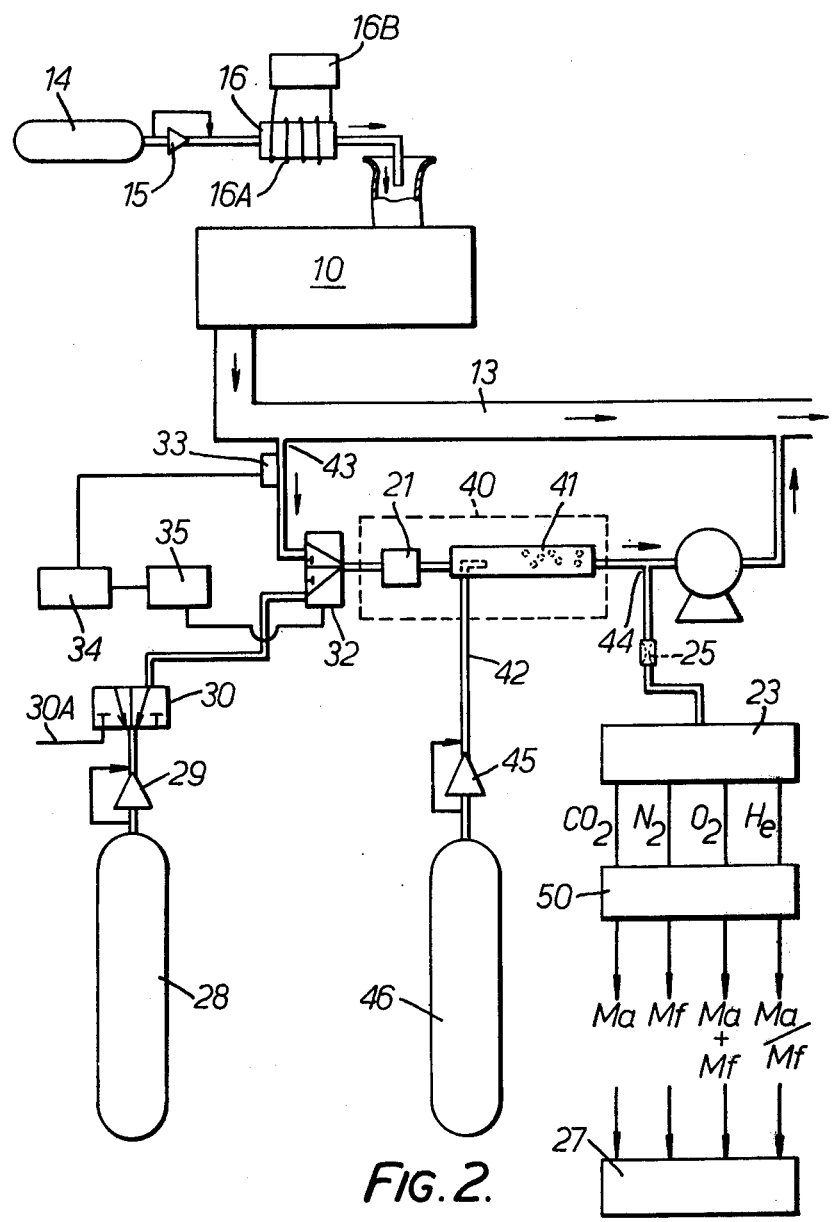
FIG. 2 is a diagram similar to FIG. 1 of a modified embodiment.

To do this requires two modifications to the system of FIG. 1, and a microprocessor programmed to process the output signals to provide and display the required values, and FIG. 2 shows such a modified system.

The first modification shown in FIG. 2 is the provision of, and insertion of, a small oven 40 and oxidation catalyst 41 in matrix or granule form maintained at 600° C, together with a tube 42 adding oxygen, in the sampling line 20 between the sampling point 43 from the exhaust system 13 and the mass spectrometer leak tap-off point 44. The tube 42 is connected via a regulating valve 45 to a cylinder 46 of compressed oxygen.

The second modification is to programme the voltages applied to the four parallel cylindrical electrodes 236 in the mass spectrometer 23 so that they sequentially change at short but regular time intervals to permit the collection in sequence of ions having molecular weights of 44 (carbon dioxide), 28 (nitrogen) 32 (oxygen) and 4 (helium). Such a programming is known practice within the field of mass spectrometer technology.

The four sequential signals from the mass spectrometer are supplied as inputs to a microprocessor 50, being digitalized in a form which is compatible with the microprocessor used. The microprocessor 50 is programmed with the necessary mathematical formulae and provided in addition with three thumbwheel switches for the manual insertion of inputs representing:

(a) The hydrogen/carbon ratio of the fuel used.
(b) The concentration of helium in the ambient air.
(c) The helium flow rate into the engine intake 12 controlled by the conditions of pressure and temperature at the critical flow orifice 16.

The values for air flow $M_a$, fuel flow $M_f$, the sum of the air and fuel flows ($M_a + M_f$), and the air/fuel ratio $M_a/M_f$ can be read off in sequence or from separate displays of the output display unit 27. As changes are made to the engine operating regime new values will be automatically determined and displayed. In addition, when required, the microprocessor can be arranged to provide integrating functions, to totalise the air and fuel consumptions during any period of engine testing from the rapidly repeated redetermination of the instantaneous values at short but discrete time intervals.

Now the combustion of the fuel $CH_n$, and the subsequent mixing with oxygen and catalyst oxidation can be expressed as:

$$CH_n + \lambda \left(1 + \frac{n}{4}\right)(O_2 + 3.76\, N_2) + YO_2 \longrightarrow \quad (1)$$

$$CO_2 + \frac{n}{2} H_2O + \left[(\lambda - 1)\left(1 + \frac{n}{4}\right) + Y\right]O_2 +$$

$$3.76\, \lambda \left(1 + \frac{n}{4}\right) N_2$$

where $n$ is the hydrogen/carbon ratio of the fuel.

This assumes that a sufficient number ($Y$) of molecules of oxygen is added to complete the combustion.

Let the number of molecules in the exhaust gas be $B$.

where $B = 1 + \frac{n}{2} + (\lambda - 1)(1 + \frac{n}{4}) + Y + 3.76\,\lambda(1 + \frac{n}{4})$ (2)

Exhaust concentration of helium = conc He =

$$\frac{M_H}{M_a + M_f} \cdot \frac{1}{4} \times$$

average molecular weight of exhaust gas.

From (1) and (2), the concentration of the exhaust components can be expressed as:

$$\text{conc } CO_2 = \frac{1}{B}$$

$$\text{conc } N_2 = \frac{3.76\, \lambda \left(1 + \frac{n}{4}\right)}{B}$$

$$\text{conc } O_2 = \frac{(\lambda - 1)\left(1 + \frac{n}{4}\right) + Y}{B}$$

Average molecular weight of exhaust gas =

$$\frac{44 + 9n + 32\left[(\lambda - 1)\left(1 + \frac{n}{4}\right) + Y\right] + 28 \times 3.76\, \lambda \left(1 + \frac{n}{4}\right)}{B}$$

$$= (44 + 9n)\, \text{conc } CO_2 + 32\, \text{conc } O_2 + 28\, \text{conc } N_2$$

From these is obtained $$\frac{M_a}{M_f} = \frac{36.51}{12 + n} \cdot \frac{\text{conc } N_2}{\text{conc } CO_2}$$

$$M_a + M_f = \frac{M_H}{\text{conc He}} [(11 + 2.25n)\, \text{conc } CO_2 +$$

$$8\, \text{conc } O_2 + 7\, \text{conc } N_2]$$

$$M_f = \frac{M_a + M_f}{\frac{M_a}{M_f} + 1}$$

$$M_a = \frac{M_a}{M_f} \times M_f$$

The expressions are programmed into the microprocessor to enable it to provide output readings of $M_a$, $M_f$, $M_a + M_f$ and $M_a/M_f$ in response to the input signals from the mass spectrometer representing the transient values of Conc $CO_2$, Conc $N_2$, Conc $O_2$ and Conc $H_2$ in the exhaust gas sample.

As regards the oxygen supply 46, 42 and the oxidation catalyst 41, only enough oxygen is required to ensure that at the entry to the matrix or pellet box of the catalyst 41 the mixture strength is leaner than stoichiometric, i.e. that an excess of oxygen over that required for complete oxidation of any carbon monoxide, unburnt hydrocarbon or hydrogen is present. The inflow of oxygen through the pipe 42 need not be metered, but a typical flow rate would be about 60 cm³/min for every liter/min of exhaust sample gas flow, or 6%, permitting the recording of air/fuel ratios down to 11 to 1. The exhaust gas sample plus the oxygen is heated in the oven 40 and passed through the catalyst bed 41 maintained at 600° C.

In this case the calibration gas bottle 28 will be the same as for the simple case of FIG. 1, being a known mixture of carbon dioxide, nitrogen, oxygen and helium. The separate supply of oxygen from cylinder 46 is turned off during calibration of the mass spectrometer.

Although the exhaust gas sample is shown extracted from the tailpipe of the engine in FIG. 1, and in FIG. 2, there is no reason why it cannot be taken close up to the engine with a consequent reduction in time lags. If required, the helium can be injected into any one of the engine's intake ports close to the inlet valve, and the mass spectrometer sample taken from the exhaust branch of the corresponding cylinder, permitting the charge flow into that individual cylinder to be determined.

What we claim as our invention and desire to secure by Letters Patent is:

1. A method of measuring the flow rate of gas at a given point in a combustion engine, which comprises introducing a constant metered flow of an inert gas, referred to as a tracer gas, into the inlet gas entering the intake of the combustion engine during the operation of the engine, simultaneously withdrawing a continuous sample flow of the exhaust gas from the engine exhaust system and supplying a constant-rate flow of the sample gas to a mass spectrometer for analysis, and operating the mass spectrometer to provide a measurement of the volumetric proportion of the tracer gas in the exhaust gas sample, and utilizing the said measurement to derive an indication of the transient value of the said flow rate of gas in the engine, oxidizing all residual CO and unburned hydrocarbons by reacting the exhaust gas sample catalytically with oxygen, prior to its supply to the mass spectrometer, and in which the mass spectrometer is adjusted to measure also the concentration of at least one more other component of the exhaust gas sample and to compare each such measurement with the measurement of that of the tracer gas, and in which the measurements provided by the mass spectrometer are utilized to derive an indication of one or more other parameters related to the transient mass flow rate of the exhaust gas leaving the engine, and, wherein, the mass spectrometer is of the quadrupole type, having an electrostatic ion separator comprising four parallel electrode rods, and including the step of adjusting the voltages applied to the four electrode rods in sequence to cause the spectrometer to provide a corresponding sequence of measurements of the concentrations of different constituents of the gas sample, and in which the resultant measurements are fed to a microprocessor programmed to give output readings in terms of the said other parameters, and, further, including the steps of selecting the said other parameters from the group comprising the inlet gas mass flow rate, the fuel mass flow rate, the sum of the inlet gas and fuel mass flow rates, and the ratio of the inlet gas mass flow rate to the fuel mass flow rate, and in which the mass spectrometer measures sequentially the concentrations of $CO_2$, $N_2$ and $O_2$ as well as that of the tracer gas in the exhaust gas sample.

2. A method as claimed in claim 1 in which the tracer gas is helium.

3. A method as claimed in claim 1 in which the metered flow of tracer gas is provided by passing the tracer gas through a temperature-controlled critical orifice.

4. A method as claimed in claim 1 in which the mass spectrometer is adjusted to measure only the concentration of the tracer gas in the exhaust gas sample, and which further comprises utilising the measurement provided by the mass spectrometer to derive an indication of the transient mass flow rate of exhaust gas from the engine.

5. A method as claimed in claim 4 which includes the further step of utilising the said indication of exhaust gas flow rate to derive therefrom an indication of the transient mass flow rate of inlet gas into the engine intake.

6. Apparatus for measuring the mass rate of gas at a given point in the combustion engine, which comprises means for introducing a metered flow of an inert tracer gas into the flow of inlet gas entering the intake of the engine, means for simultaneously and continuously withdrawing a sample flow of the exhaust gas from the engine, a mass spectrometer and means for supplying a constant rate flow of the sample gas thereto for analysis, said mass spectrometer being operable to determine the volumetric proportion of the tracer gas in the sample, said apparatus including means for calibrating the readings of said mass spectrometer, said means comprising a supply of a compressed gaseous calibrating mixture of the tracer gas and of other gases in known proportions, valve means for selectively supplying a metered flow of the calibrating mixture to said mass spectrometer in place of the exhaust gas sample, said apparatus including means for sensing the running condition of the engine and for providing a signal indicating the stopping of the engine, and means for utilizing the said signal to disconnect the exhaust gas sample from the mass spectrometer and to switch over the mass spectrometer to the calibration mixture supply.

7. Apparatus as claimed in claim 6 in which the means for introducing a metered flow of tracer gas comprises a temperature-controlled "critical orifice" connected to a supply of tracer gas under a constant pressure sufficient to produce critical flow through the orifice.

8. Apparatus as claimed in claim 6 in which the tracer gas is helium gas.

9. Apparatus as claimed in claim 6 which includes means for utilising the measurement of the volumetric proportion of tracer gas in the sample to derive a measurement of the transient value of the mass flow rate of the exhaust gas from the engine.

10. Apparatus as claimed in claim 9 including means for deriving from the said measurement of exhaust gas flow rate a measurement of the transient value of the mass flow rate of inlet gas into the engine intake.

11. Apparatus as claimed in claim 6 in which the mass spectrometer is of the Quadrupole type, having an electrostatic ion separator comprising four parallel charged electrode rods.

12. Apparatus as claimed in claim 11 including means for cyclically varying the voltages applied to the electrode rods to cause the spectrometer to measure in sequence the volumetric concentrations of the tracer gas and of other constituents of the exhaust gas sample, and means for utilizing the said measurements to derive measurements of other parameters related to the mass flow rate of the exhaust gas.

13. Apparatus as claimed in claim 12 including means for injecting additional oxygen into the exhaust gas and means for catalytically reacting the exhaust gas therewith prior to its being supplied to the mass spectrometer.

14. Apparatus as claimed in claim 13 in which the means for utilizing the said measurements comprises a microprocessor programmed to provide direct indications of the said parameters.

15. Apparatus as claimed in claim 14 in which the said other parameters are selected from the group comprising the mass flow rate of intake gas into the engine, the fuel flow rate, the sum of the inlet gas mass flow and fuel flow rates, and the ratio of the inlet gas mass flow rate to the fuel flow rate.

16. Apparatus as claimed in claim 6 in which the sensing means comprises an electric circuit including a vibration-responsive switch.

* * * * *